United States Patent [19]

Sandis et al.

[11] 4,199,474
[45] * Apr. 22, 1980

[54] CATALYSTS FOR POLYMERIZING OLEFINS

[75] Inventors: Stylianos Sandis, Lavera; Jean C. Bailly, Martigues, both of France

[73] Assignee: Naphtachimie Societe Anonyme, Courbevoie, France

[*] Notice: The portion of the term of this patent subsequent to Aug. 29, 1995, has been disclaimed.

[21] Appl. No.: 876,357

[22] Filed: Feb. 9, 1978

[30] Foreign Application Priority Data

Feb. 23, 1977 [FR] France ............................... 77 05269

[51] Int. Cl.$^2$ .............................................. C08F 4/64
[52] U.S. Cl. ................................ 252/429 B; 526/142
[58] Field of Search ...................................... 252/429 B

[56] References Cited

U.S. PATENT DOCUMENTS

| | | | |
|---|---|---|---|
| 2,976,252 | 3/1961 | Leary et al. | 252/429 A |
| 3,116,274 | 12/1963 | Boehm et al. | 252/429 B X |
| 3,652,705 | 3/1972 | Alakawa et al. | 252/429 B X |
| 3,813,374 | 5/1974 | Perry | 252/429 B X |
| 3,864,278 | 2/1975 | La Heij et al. | 252/429 B |
| 4,110,248 | 8/1978 | Sandis et al. | 252/429 B |

FOREIGN PATENT DOCUMENTS 1152192  5/1969  United Kingdom .

*Primary Examiner*—Patrick Garvin
*Attorney, Agent, or Firm*—McDougall, Hersh & Scott

[57] ABSTRACT

A process for producing titanium-trichloride based catalyst comprising reducing titanium tetrachloride in excess with an organo-aluminum compound in the presence of 2 to 5 mols per mol of organo-aluminum of one or more aliphatic ethers having the formula R'—O—R" in which R' and R" are alkyl groups containing 1 to 5 carbon atoms and maturing the formed precipitate at a temperature within the range of 80°–115° C., said catalyst being useful with an organo-metallic co-catalyst in the polymerization of olefins.

18 Claims, No Drawings

CATALYSTS FOR POLYMERIZING OLEFINS

This invention relates to a process for producing catalysts based on titanium trichloride, which are suitable for use in the polymerization of alpha-olefins, in association with an organo-metallic co-catalyst.

It is known to polymerize alpha-olefins, such as ethylene or propylene, under pressures which are generally lower than 40 bars, by means of a catalytic system comprising on the one hand a titanium trichloride-based catalyst and on the other hand an organo-metallic co-catalyst, which in most cases comprises an organo-aluminum compound. In particular, the applicants have proposed, in U.S. application Ser. No. 764,566, filed Feb. 1, 1977, now U.S. Pat. No. 4,110,248 and entitled MANUFACTURE OF CATALYSTS FOR POLYMERIZATION OF OLEFINS, a process for producing titanium trichloride-based catalysts which can be used for the polymerization of alpha-olefins, which comprises reducing titanium tetrachloride in excess by an organo-aluminum compound, then maturing the formed precipitate in the medium in which it was formed, the process being characterized in that:

the ratio between the number of mols of titanium tetrachloride and the number of organic gram equivalents of the organo-aluminum compound is at least equal to 1.8;

the organo-aluminum compound comprises a compound of formula $AlR_nX_{3-n}$, wherein R is an alkyl, cycloalkyl, aryl or aralkyl group containing from 1 to 12 carbon atoms, X is a hydrogen atom or a halogen atom, preferably chlorine or bromine, and n is an integer or a fraction capable of being of any value of from 1 to 3 and preferably from 1.5 to 3;

the process is performed in the presence of from 2 to 5 mols per mol of organo-aluminum compound, of one or more aliphatic ethers having the formula R'—O—R" in which R' and R" are alkyl groups containing from 1 to 12 carbon atoms;

the reduction of the titanium tetrachloride is effected at from $-10°$ to $60°$ C. and preferably from $0°$ to $50°$ C.;

maturing of the precipitate is effected at from $20°$ to $100°$ C. and preferably from $30°$ to $80°$ C., for a period of from 15 minutes to 24 hours and preferably from 1 hour to 4 hours.

It has been observed, and this is at the origin of the present invention, that it is possible to prepare catalyts having equally remarkable properties, by using smaller amounts of titanium tetrachloride than in the above-stated process, on the condition however that maturing of the titanium trichloride precipitate is effected at a temperature of from $80°$ to $115°$ C.

The invention has for its object a process for producing titanium trichloride-based catalysts which can be used for the polymerization of alpha-olefins, which process comprises reducing titanium tetrachloride in excess by an organo-aluminum compound, then maturing the formed precipitate in the medium in which it was formed, the process being characterized in that:

the ratio between the number of mols of titanium tetrachloride and the number of organic gram equivalents of the organo-aluminum compound is from 1.2 to 1.8 and preferably from 1.3 to 1.6;

the organo-aluminum compound comprises a compound of the formula $AlR_nX_{3-n}$, in which R is an alkyl, cycloalkyl, aryl or aralkyl group containing from 1 to 12 carbon atoms, X is a hydrogen atom or a halogen atom, preferably chlorine or bromine, and n is an integer or a fraction which is capable of being of any value from 1 to 3 and preferably from 1.5 to 3;

the process is performed in presence of from 2 to 5 mols per mol of organo-aluminum compound, of one or more aliphatic ethers having the formula R'—O—R" in which R' and R" are alkyl groups containing from 1 to 5 carbon atoms;

the reduction of the titanium tetrachloride is effected at $-10°$ to $80°$ C. and preferably from $10°$ to $60°$ C.;

maturing of the precipitate is effected at from $80°$ to $115°$ C. and preferably from $90°$ to $110°$ C., for a period of from 15 minutes to 24 hours and preferably from 1 hour to 4 hours.

As stated above, the amount of titanium tetrachloride used must be from 1.2 to 1.8 mol per organic gram equivalent of the organo-aluminum compound. When the latter comprises for example a dialkylaluminum chloride which has two organic reducing groups per molecule, that is to say, two organic gram equivalents per mol, this means that the molar ratio titanium tetrachloride/dialkylaluminum chloride must be from 2.4 to 3.6.

For the sake of convenience, the process of the invention can be carried out in an inert solvent such as a liquid saturated aliphatic hydrocarbon. This solvent can be used in mixture with the titanium tetrachloride, the organo-aluminum compound, the ether or with two or more of such compounds.

Reduction of the titanium tetrachloride is advantageously effected with slightly turbulent stirring so as to produce a titanium trichloride precipitate comprising granules of regular shape, preferably of substantially spherical shape, which are convenient for use in the polymerization of alpha-olefins.

One method for reducing the titanium tetrachloride comprises bringing the reagents together at a sufficiently low temperature, of from $-40°$ to $-10°$ C., to ensure that the reaction does not occur, then heating the mixture, preferably with agitation, to a temperature sufficient to cause the reaction, at a temperature of from $-10°$ to $80°$ C.

Reduction of the titanium tetrachloride is preferably effected in accordance with another mode of operation which comprises first preparing, at a temperature of from $-40°$ to $50°$ C. and preferably from $0°$ to $30°$ C., a mixture of the organo-aluminum compound and at least one fraction of the ether or ethers; the amount of ether used is so selected that the ratio between the number of mols of ether and the number of mols of the organo-aluminum compound is from 0.30 to 5. The mixture can advantageously be diluted by an inert solvent, such as a liquid saturated aliphatic hydrocarbon. Reduction of the titanium tetrachloride is then effected by introducing the mixture prepared in the above-given manner, into the titanium tetrachloride; if necessary, the titanium tetrachloride may be diluted with a fraction of the ether or ethers, and possibly with a liquid saturated aliphatic hydrocarbon. The operation of introducing the mixture is advantageously effected in a slow and regular manner, with slightly turbulent agitation, so as to ensure good contact between the reagents, without causing the formation of substantial amounts of titanium trichloride particles having a diameter of less than 10 microns.

Reduction of the titanium tetrachloride is generally effected at a constant temperature but it is also possible to vary the temperature during the operation, for example in such a way as to terminate the reduction operation at a higher temperature than that at the beginning of the operation.

The precipitate which is formed in this manner is then maintained in the medium in which it was prepared, preferably with agitation, during the above-mentioned maturing operation. Maturing can be effected at a constant temperature but it is also possible to vary the temperature during the maturing operation, in most cases raising the temperature in the course of operation. It is preferable to wash the catalyst produced after the maturing operation, by means of an inert solvent such as a saturated hydrocarbon, before using it in the polymerization of olefins. The washing operation can be easily carried out by decantation of the precipitate and removal of the liquid floating on the top, which can be replaced a certain number of times by fresh solvent, in order to remove the soluble compounds retained by the catalyst, in particular the excess titanium tetrachloride.

The resulting catalysts can be preserved, protected from air and humidity, without alteration in their catalytic properties.

The catalysts prepared according to the process of the invention are endowed with a high degree of catalytic activity in the polymerization of olefins, both in the presence of a liquid dispersing agent and in gaseous phase. These catalysts can be used in the polymerization or co-polymerization of olefins having the formula $CH_2=CHR'''$ in which $R'''$ represents hydrogen or an alkyl radical having from 1 to 8 carbon atoms. In this type of polymerization operation, the catalysts are associated with co-catalysts preferably selected from organo-metallic compounds of the metals of groups II and III of the periodic table of elements, such as organo-aluminum compounds having the mean formula $AlR_m^{IV}X_{3-m}$, in which $R^{IV}$ represents an alkyl group having from 1 to 12 carbon atoms, X is a hydrogen atom or a halogen atom, preferably chlorine, and m is an integer or a fraction which can be of any value from 1 to 3.

These co-catalysts are advantageously used in amounts such that the atomic ratio of the metals of groups II and III of the co-catalysts to the titanium of the catalysts, is from 1 to 50.

In an alternative form, polymerization of the olefins can also be effected in the presence of electron donors, comprising compounds containing at least one free electronic doublet carried by an atom such as oxygen, sulphur, nitrogen, or phosphorus; preferably, the electron donors comprise ethers corresponding to the above-mentioned definition.

The catalysts of the invention can be used in particular for the polymerization of olefins in accordance with the socalled "low-pressure" method which generally comprises operating under a pressure below 40 bars and at a temperature of from 40° to 150° C. Polymerization can be carried out within a liquid in which the catalyst is dispersed, which liquid may be formed for example of the liquified monomer and/or of a saturated aliphatic hydrocarbon; polymerization may also be effected in the gaseous phase in the absence of a liquid diluent. During polymerization, it is possible to act on the mean molecular weight of the polymer formed by means of a chain limiter, such as hydrogen, in molecular proportions, relative to the olefin to be polymerized, which are generally from 0.1 to 60%. Polymerization is stopped when the desired degree of advancement in respect of the reaction is achieved; in most cases the mean molecular weight of the polymer produced is from 50,000 to 1,000,000, in the case of polymers intended for usual uses of thermoplastic materials. By virtue of the high degree of activity of the catalysts of the invention, the polymers produced contain only very small amounts of catalytic residues and they can generally by put to use without having to undergo any purification treatment.

The catalysts prepared in accordance with the invention have particular attraction in the polymerization of propylene and its higher homologues because their high degree of activity is accompanied by a high level of stereospecificity; expressed in a percentage by weight of polypropylene insoluble in boiling n-heptane, such stereospecificity is higher than 95% and frequently reaches 97% and higher.

EXAMPLE 1

(a) Preparation of the Catalyst

Operation is in a stainless steel 2-liter reaction vessel provided with a mechanical stirrer comprising a flat parallelepipedal blade measuring 50×80×2 mm, rotating at 500 rpm. The reaction vessel is provided with a device for heating or cooling through the wall. 228 g (1.2 mol) of $TiCl_4$, 240 ml of n-heptane and 54 g (0.34 mol) of diisoamyl ether are introduced into the reaction vessel, at a temperature of 25° C. The mixture is heated to a temperature of 55° C. and, at that temperature, a solution which is produced by mixing 140 g (0.88 mol) of diisoamyl ether and 60 g (0.50 mol) of diethyl-aluminum chloride dissolved in 360 ml of n-heptane is introduced at 25° C. into the reaction vessel over a period of 4 hours, at a regular flow rate. The mixture is kept under agitation 1 hour at 55° C., then 2 hours at 110° C. The precipitate formed, which contains 0.98 at. g of titanium, is washed 5 times by decantation with 1 liter of n-heptane at 65° C. The resulting catalyst is in the form of a brown-violet precipitate; it is preserved in n-heptane, protected from air and humidity. The mean diameter of the particles forming the catalyst is 24 microns.

(b) Polymerization of Propylene

Operation is in a stainless steel 5-liter reaction vessel provided with a mechanical stirrer of the impellar type, rotating at 500 rpm; the reaction vessel is also provided with a double-casing heating and cooling device. After the reaction vessel has been purged by means of nitrogen, 2 liters of n-heptane, 16 millimols of diethylaluminum chloride and an amount of the catalyst prepared in Example 1(a), corresponding to 0.8 milligram atoms titanium, are successively introduced into the reaction vessel. The reaction medium is raised to a temperature of 60° C., and 200 mlN of hydrogen, and propylene, are introduced thereinto until there is an absolute pressure of 7 bars, this pressure being maintained constant throughout the polymerization operation; after 30 minutes, 1 hour, 2 hours, 3 hours and 4 hours of polymerization, 200 mlN of hydrogen is injected into the reaction vessel. After polymerization for 5 hours, the unpolymerized propylene is degassed, the n-heptane is carried away by means of water vapor and the polymer is dried; 556 g of a polypropylene having the following characteristics is collected:

titanium content: 69 ppm (parts per million by weight);
fraction soluble in boiling n-heptane: 3.6%;
fluidity index under 2.16 kg at 230° C.: 2;
apparent density in $g/cm^3$: 0.47.

EXAMPLE 2

(a) Preparation of the Catalyst

Operation is as in Example 1a, except that the amount of titanium tetrachloride used is 266 g (1.4 mol) and that maturing is effected for 2 hours at 100° C.

(b) Polymerization of Propylene

Operation is as in Example 1b. After polymerization for 5 hours, 672 g of polypropylene having the following characteristics is collected:
titanium content: 57 ppm;
fraction soluble in boiling n-heptane: 2.4%;
fluidity index under 2.16 kg at 230° C.; 2.5;
apparent density in g/cm$^3$: 0.46.

EXAMPLE 3

(a) Preparation of the Catalyst

Operation is as in Example 1(a), except that the amount of titanium tetrachloride used is 304 g (1.6 mol) and that maturing is effected for 2 hours at 100° C.

(b) Polymerization of the Propylene

Operation is as in Example 1(b). After polymerization for 5 hours, 662 g of a polypropylene having the following characteristics is collected:
titanium content: 58 ppm;
fraction soluble in boiling n-heptane: 2%;
fluidity index under 2.16 kg at 230° C.; 2.3;
apparent density in g/cm$^3$: 0.46.

EXAMPLE 4

(a) Preparation of the Catalyst

Operation is as in Example 1a, except that the amount of titanium tetrachloride used is 332 g (1.75 mol), reduction of the titanium tetrachloride is effected at 35° C. instead of at 55° C., and maturing is effected for 2 hours at 90° C.

(b) Polymerization of the Propylene

Operation is as in Example 1(b). After polymerization for 5 hours, 686 g of a polypropylene having the following characteristics is collected:
titanium content: 56 ppm;
fraction soluble in boiling n-heptane: 2.1%;
fluidity index under 2.16 kg at 230° C.: 1.7;
apparent density in g/cm$^3$: 0.48.

EXAMPLE 5

(comparative example)

(a) Preparation of the Catalyst

Operation is as in Example 1(a), except that the amount of titanium tetrachloride used is 190 g (1 mol) and maturing is effected for two hours at 115° C.

(b) Polymerization of Propylene

Operation is as in Example 1b. After polymerization for 5 hours, 460 g of a polypropylene having the following characteristics is collected.
titanium content: 83 ppm;
fraction soluble in boiling n-heptane: 10.1%;
fluidity index under 2.16 kg at 230° C.: 2.3;
apparent density in g/cm$^3$: 0.37.

It is noted that the catalyst of this example, which was prepared without excess of titanium tetrachloride relative to the diethyl aluminum chloride, results in the formation of a polypropylene having a very substantial soluble polymer content.

EXAMPLE 6

(comparative example)

(a) Preparation of the Catalyst

Operation is as in Example 1(a), except that the amount of titanium tetrachloride used is 285 g (1.5 mol), the reduction of titanium tetrachloride is effected at 35° C. instead of at 55° C., and maturing is effected for 2 hours at 65° C.

(b) Polymerization of Propylene

Operation is as in Example 1b. After polymerization for 5 hours, 500 g of a polypropylene having the following characteristics is collected:
titanium content: 77 ppm;
fraction soluble in boiling n-heptane: 17.2%.

It is noted that the catalyst prepared in this example, which was matured at a temperature of 65° C., results in the formation of a polypropylene in which the soluble polymer content is very substantial.

In the description and the examples above:
at.g means atom-gram
m.at.g. means milliatom-gram
ml means milliliter
mlN means normal milliliter

We claim:

1. In a process for the production of solid catalyst based on titanium trichloride used in the polymerization of alpha-olefins, wherein titanium tetrachloride is reduced by an organoaluminum compound to form a precipitate and then the precipitate is matured in the presence of its formation media, the improvement comprising reducing the titanium tetrachloride with the organo-aluminum compound such that:

the ratio between the number of mols of titanium tetrachloride and the number of organic gram equivalents of the organo-aluminum compound is from 1.2 to 1.8;

the organo-aluminum compound comprises a compound having the formula $AlR_nX_{3-n}$, in which R is an alkyl, cycloalkyl, aryl or aralkyl group containing from 1 to 12 carbon atoms, X is a hydrogen atom or a halogen atom, and n is an integer or a fraction capable of being of any value of from 1 to 3;

the process is performed in the presence of from 2 to 5 mols of organo-aluminum compound, of one or more aliphatic ethers having the formula R'—O—R" in which R' and R" are alkyl group containing from 1 to 5 carbon atoms in which the organo-aluminum compound is admixed with at least a part of the ether prior to admixture with the titanium tetrachloride;

the reduction of the titanium tetrachloride is performed at −10° to 80° C.;

maturing of the precipitate is performed at from 80° to 115° C. for a period of from 15 minutes to 24 hours and recovering the solid catalyst.

2. A process as claimed in claim 1, which is performed in a liquid saturated aliphatic hydrocarbon.

3. A process as claimed in claim 1 which includes the step of carrying out the process with agitation.

4. A process as claimed in claim 1 which comprises effecting reduction of the titanium tetrachloride by mixing the reagents at a temperature of from −40° to −10° C., then heating the resulting mixture at a temperature of from −10° to 80° C.

5. A process as claimed in any one of claims 1 to 4, which comprises first preparing, at a temperature of from −40° to 50° C., a mixture of ether and organo-aluminum compound, such that the ratio between the number of mols of ether and the number of mols of organo-aluminum compound is from 0.30 to 5, then introducing such mixture into the titanium tetrachloride.

6. A process as claimed in claim 1 which includes the step of washing the catalyst after maturing, by means of an inert solvent.

7. A catalyst system comprising the catalysts prepared in accordance with claim 1 in association with co-catalysts comprising organo-metallic compounds of the metals of groups II and III of the periodic table of elements, such that organo-aluminum compounds having the mean formula $AlR_m^{IV}X_{3-m}$, in which $R^{IV}$ represents an alkyl radical having from 1 to 12 carbon atoms, X represents a hydrogen atom or a halogen atom, and m represents an integer or a fraction which can be of any value of from 1 to 3, for polymerization or co-polymerization, under a pressure lower than 40 bars and at a temperature of from 40° to 150° C., of olefins having the formula $CH_2=CHR'''$ in which $R'''$ represents hydrogen or an alkyl radical having from 1 to 8 carbon atoms.

8. The catalysts prepared in accordance with the process of claim 1.

9. A process as claimed in claim 1 in which the ratio between the number of mols of titanium tetrachloride and the number of gram equivalents of the organo-aluminum compound is within the range of 1.3–1.6.

10. A process as claimed in claim 1 in which the halogen atom is an atom of chlorine or bromine.

11. A process as claimed in claim 1 in which n is a number or fraction of from 1.5–3.

12. A process as claimed in claim 1 in which the reduction of the titanium tetrachloride is carried out at a temperature within the range of 10–60° C.

13. A process as claimed in claim 1 in which the precipitate is matured at a temperature within the range of 90°–110° C.

14. A process as claimed in claim 1 in which the precipitate is matured for a period of time of from 1–4 hours.

15. A process as claimed in claim 5 in which the mixture is prepared at a temperature within the range of 0°–30° C.

16. A process as claimed in claim 5 in which the mixture is prepared in an inert solvent.

17. A process as claimed in claim 5 in which the titanium tetrachloride into which the mixture is introduced in diluted with a liquid saturated hydrocarbon or ether or mixtures thereof.

18. A process as claimed in claim 6 in which the inert solvent is a saturated hydrocarbon.

* * * * *